United States Patent
Brown et al.

(10) Patent No.: US 9,996,806 B2
(45) Date of Patent: Jun. 12, 2018

(54) MODELING AN ENTERPRISE

(71) Applicant: INTERNATIONAL BUSINESS MACHINES CORPORATION, Armonk, NY (US)

(72) Inventors: William A. Brown, Raleigh, NC (US); Francis X. Reddington, Sarasota, FL (US); Martin A. Wolfe, Mooresville, NC (US)

(73) Assignee: International Business Machines Corporation, Armonk, NY (US)

( * ) Notice: Subject to any disclaimer, the term of this patent is extended or adjusted under 35 U.S.C. 154(b) by 811 days.

(21) Appl. No.: 13/628,111

(22) Filed: Sep. 27, 2012

(65) Prior Publication Data

US 2014/0089224 A1 Mar. 27, 2014

(51) Int. Cl.
*G06F 9/44* (2018.01)
*G06Q 10/06* (2012.01)

(52) U.S. Cl.
CPC ............. *G06Q 10/06* (2013.01); *G06F 8/35* (2013.01)

(58) Field of Classification Search
None
See application file for complete search history.

(56) References Cited

U.S. PATENT DOCUMENTS 6,208,345 B1 * 3/2001 Sheard .................... G06F 8/34 709/201
7,117,449 B1 * 10/2006 Levin et al. .................. 715/765
(Continued)

FOREIGN PATENT DOCUMENTS

WO WO 2008/011137 A2 1/2008

OTHER PUBLICATIONS

MacDonald et al. "Deferring Design Pattern Decisions and Automating Structural Pattern Changes Using a Design-Pattern-Based Programming System", Apr. 2009, Acm Transactions on Programming Languages and Systems, vol. 31, No. 3, Article 9.*

(Continued)

*Primary Examiner* — Jue Louie
(74) *Attorney, Agent, or Firm* — Brandon C. Kennedy; John R. Pivnichny; Kennedy Lenart Spraggins LLP (57) ABSTRACT

Computer implemented methods, apparatuses, and compute program products for modeling an enterprise are provided. Embodiments include providing to a user, by an enterprise modeling controller, a user interface comprising an icon carousel and a drop area interface for moving selected icons from the icon carousel. The icon carousel contains a plurality of icons, where each icon of the plurality of icons represents a particular solution component configuration. Embodiments also include for each icon within the drop area interface, identifying a corresponding solution component configuration and configuration data associated with the solution component configuration. Embodiments also include generating based on the configuration data associated with the identified solution component configurations one or more integration patterns indicating data processing relationships of the identified solution component configurations. Embodiments also include generating an enterprise model based on the identified solution component configurations and the one or more integration patterns.

12 Claims, 7 Drawing Sheets

(56) References Cited

U.S. PATENT DOCUMENTS

| | | | |
|---|---|---|---|
| 7,174,370 B1* | 2/2007 | Saini et al. | 709/220 |
| 7,770,151 B2 | 8/2010 | Sanjar et al. | |
| 7,895,567 B2 | 2/2011 | Grotjohn et al. | |
| 8,856,058 B1* | 10/2014 | Martin et al. | 706/47 |
| 2002/0073396 A1* | 6/2002 | Crupi | G06F 8/20 717/104 |
| 2003/0122867 A1* | 7/2003 | Choi et al. | 345/748 |
| 2003/0177481 A1* | 9/2003 | Amaru et al. | 717/148 |
| 2003/0182461 A1* | 9/2003 | Stelting | G06Q 99/00 719/310 |
| 2005/0091093 A1* | 4/2005 | Bhaskaran | G06Q 10/06 705/7.36 |
| 2005/0096937 A1* | 5/2005 | Subash | G06F 8/10 717/104 |
| 2006/0190931 A1* | 8/2006 | Scott | G06F 8/20 717/136 |
| 2007/0150864 A1* | 6/2007 | Goh | 717/113 |
| 2007/0234282 A1* | 10/2007 | Prigge | G06Q 10/10 717/107 |
| 2008/0059450 A1* | 3/2008 | Joseph | G06F 9/5038 707/999.005 |
| 2009/0198532 A1* | 8/2009 | Litoiu | G06Q 10/06 705/7.41 |
| 2010/0088664 A1* | 4/2010 | Khodabandehloo et al. | 717/103 |
| 2011/0029947 A1* | 2/2011 | Markovic | G06Q 10/10 717/102 |
| 2011/0093406 A1* | 4/2011 | Angel et al. | 705/348 |
| 2011/0246635 A1 | 10/2011 | Phukan | |
| 2011/0246961 A1* | 10/2011 | Tripathi | G06F 8/34 717/105 |
| 2013/0167109 A1* | 6/2013 | Nucci et al. | 717/105 |
| 2013/0204884 A1* | 8/2013 | Stewart et al. | 707/755 |
| 2013/0317803 A1* | 11/2013 | Manley et al. | 703/21 |

OTHER PUBLICATIONS

Kueng et al. "Goal-Based Business Process Models: Creation and Evaluation", 1996, Informatics Process Group, Department of Computer Science, University of Manchester, UK.*

Engelsman et al. "Extending Enterprise Architecture Modelling with Business Goals and Requirements" Feb. 2011, Enterprise Information Systems, vol. 5, No. 1.*

Frankel et al. "The Zachman Framework and the OMG's Model Driven Architecture", 2003, Business Process Trends.*

Pereira et al. "A method to Define an Enterprise Architecture using the Zachman Framework", 2004, Proceedings of the 2004 ACM symposium on Applied computing.*

Sousa et al. "Applying the Zachman Framework Dimensions to Support Business Process Modeling", 2007, Digital Enterprise Technology.*

TMAXSOFT, "SOA-based Development", 2008, pp. 1-8, Tmax Soft, Inc., San Jose, CA, USA.

* cited by examiner

MODELING AN ENTERPRISE

BACKGROUND OF THE INVENTION

Field of the Invention

The field of the invention is data processing, or, more specifically, computer implemented methods, apparatuses, and computer program products for modeling an enterprise.

Description of Related Art

An enterprise in general is a unit of economic organization or activity. These activities may be used to develop and deliver products and/or services to a customer. An enterprise may be composed of a number of functions and operations such as for example, purchasing, manufacturing, marketing, finance, engineering, and research and development.

Persons wishing to improve the performance of the operations of the enterprise may chose to create a model of the enterprise. Enterprise modeling is the process of building models of whole or part of an enterprise with process models, data models, resource models and or new ontologies etc. Enterprise modeling may also include enterprise architecture (EA), which is the process of translating business vision and strategy into effective enterprise change by creating, communicating and improving the key requirements, principles and models that describe the enterprise's future state and enable its evolution.

Practitioners of EA are often referred to as enterprise architects. An enterprise architect is a person responsible for performing this complex analysis of business structure and processes and is often called upon to draw conclusions from the information collected. The conclusions generated as part of the enterprise architecture are often used to implement changes to the enterprise to improve the efficiency, effectiveness, agility, and durability of the enterprise.

SUMMARY OF THE INVENTION

Computer implemented methods, apparatuses, and compute program products for modeling an enterprise are provided. Embodiments include providing to a user, by an enterprise modeling controller, a user interface comprising an icon carousel and a drop area interface for moving selected icons from the icon carousel. The icon carousel contains a plurality of icons, where each icon of the plurality of icons represents a particular solution component configuration. Embodiments also include for each icon within the drop area interface, identifying, by the enterprise modeling controller, a corresponding solution component configuration and configuration data associated with the solution component configuration. Embodiments also include generating based on the configuration data associated with the identified solution component configurations, by the enterprise modeling controller, one or more integration patterns indicating data processing relationships of the identified solution component configurations. Embodiments also include generating, by the enterprise modeling controller, an enterprise model based on the identified solution component configurations and the one or more integration patterns.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Exemplary methods, apparatuses, and computer program products for modeling an enterprise in accordance with the present invention are described with reference to the accompanying drawings, beginning with FIG. 1. Modeling an enterprise in accordance with the present invention is generally implemented with computers, that is, with automated computing machinery. For further explanation, therefore, FIG. 1 sets forth a block diagram of automated computing machinery comprising an exemplary computer (152) useful in modeling an enterprise according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an enterprise modeling controller (199) that includes computer program instructions for modeling an enterprise according to embodiments of the present invention. Specifically, the enterprise modeling controller (199) may include computer program instructions that when executed by the computer processor (156) cause the enterprise modeling controller (199) to carry out the step of providing a user interface to a user (101). A user may be any person that wishes to model an enterprise. Examples of users of an enterprise modeling controller include enterprise architects. An enterprise architect is a person that works closely with an enterprise sponsor and key stakeholders of the enterprise, both internal and external to the enterprise, to understand the enterprise mission, vision and strategy and the sponsor's ideas about the approach. The often goal of the architect is to articulate the existing enterprise infrastructure value-chain: market, business, systems and technology. Architects then present and discuss the technology, systems, business and market options to fulfill the enterprise mission. According to embodiments of the present invention, the user (101) may utilize the user interface provided by the enterprise modeling controller (199) to articulate the enterprise information value chain and present a 'solution.'

In a particular embodiment, the user interface includes an icon carousel and a drop area interface for moving selected icons from the icon carousel. The icon carousel may contain a plurality of icons, where each icon of the plurality of icons represents a particular solution component configuration.

A solution component configuration is a particular configuration of a solution component. A solution component is a representation of some aspect of an enterprise. Examples of solution components include business processes of an enterprise. A business process is a collection of related, structured activities or tasks that produce a specific service or product (serve a particular goal) for a particular customer or customers. An example of a business process is a management process that governs the operation of a system. Examples of management processes include "Corporate Governance" and "Strategic Management." Another example of a business process is an operational process that constitutes the core business and creates the primary value stream. Examples of typical operational processes are purchasing, manufacturing, marketing, and sales. Another example of a business process is a supporting process that supports the core processes. Examples may include accounting, recruitment, and technical support.

A business process can be decomposed into several sub-processes, which have their own attributes, but also contribute to achieving the goal of the super-process. The analysis of business processes typically includes the mapping of processes and sub-processes down to activity level. A business process model is a model of one or more business processes, and defines the ways in which operations are carried out to accomplish the intended objectives of an organization.

A solution component may also be a workflow that occurs within the enterprise. A workflow is a depiction of a sequence of operations, declared as work of a person, work of a simple or complex mechanism, work of a group of persons, or machines. Workflow may be seen as any abstraction of real work, segregated in workshare, work split or whatever types of ordering. For control purposes, workflow may be a view on real work under a chosen aspect.

Solution components may also be events that occur between other solution components and messages exchanged between solution components. Solution components may also be resources used by the enterprise, such as databases and legacy application. Other examples of solution components may include services used by other solution components within the enterprise, such as web-based services that provide workplace productivity tools.

As explained above, a solution component configuration is a particular configuration of a solution component. That is, the configuration represents a solution component performing one or more particular tasks in one or more particular ways. For example, a supplier solution component configuration may represent a supplier solution component that receives acquisition orders by fax and transmits purchase orders by email. A solution component configuration may have configuration data associated with it. Configuration data is a data structure containing all the parameters and characteristics associated with the particular solution component configuration.

In a particular embodiment of the present invention, the icons in the icon carousel represent all of the solution component configurations available to a user of the enterprise modeling controller (199). A carousel may represent the icons in a three dimensional manner, which rotates to display one or more of the icons at a particular time. As will be explained below, a user may add additional solution component configurations and delete solution component configurations to the enterprise modeling controller. Adding or deleting solution component configurations may result in icons being added or deleted, respectively, from the icon carousel. In a particular embodiment in which the carousel is three-dimensional, icons may be added to the carousel seamlessly as the new icons are displayed as the carousel rotates.

A drop area interface of the user interface serves as a sort of 'building area' for a model of an enterprise. That is, a user may build a model of an enterprise by first identifying the solution component of an enterprise. For each identified solution component, a user may select an icon from the icon carousel representing the solution component and drag the selected icons to the drop area interface.

The enterprise modeling controller (199) may also include computer program instructions that when executed by the computer processor (156) cause the enterprise modeling controller to carry out the step of for each icon within the drop area interface, identifying a corresponding solution component configuration and configuration data associated with the solution component configuration. The enterprise modeling controller (199) may also include computer program instructions that when executed by the computer processor (156) cause the enterprise modeling controller to carry out the step of generating based on the configuration data associated with the identified solution component configurations, one or more integration patterns indicating data processing relationships of the identified solution component configurations. An integration pattern is a connection configuration that indicates how particular solution component configurations interoperate, types of services that are employed, and methods that are used. For example, an integration pattern may recognize that a supplier solution component configuration and a manufacturer solution component configuration would typically use an enterprise web-based service to communicate an acquisition message in response an event occurring. In this example, generation of the integration pattern may result in the supplier solution component configuration being linked to the enterprise service and both configurations utilizing the enterprise web-based services to communicate.

The enterprise modeling controller (199) may also include computer program instructions that when executed by the computer processor (156) cause the enterprise modeling controller to carry out the steps of generating an enterprise model based on the identified solution component configurations and the one or more integration patterns. An enterprise model is a representation of the solution component configurations connected in one or more integration patterns. Said another way, an enterprise model is an abstract representation, description and definition of the structure, processes, information and resources of an identifiable business, government body, or other large organization. An enterprise model represents a form of 'solution architecture,' which is relative to the decisions ahead, a specific blend of technology, systems, and business and market options. That is, an enterprise model may be considered a model that describes the logical organization of business functions, business capabilities, business processes, people, information resources, business systems, software applications, computing capabilities, or information exchange and communications infrastructure within the enterprise.

An enterprise model may be composed of many different layers or domains. Each domain may provide a distinct type of information. The enterprise modeling controller (199) may also include computer program instructions that when executed by the computer processor (156) cause the enterprise modeling controller (199) to generate a specification based on the enterprise model. According to embodiments of the present invention, a different specification may be generated for each domain of the enterprise model. For example, from one enterprise model, an enterprise modeling controller may generate a planner's view specification, an owner's view specification, a designer's view specification and a developer's view specification. For example, the planner's view specification may state the enterprise's objectives and goals, the owner's view specification may indicate the enterprise's processes and organization, the designer's view specification may indicate the enterprise's systems and data, and the developer's view specification may recite the technology used to implement the enterprise. That is, the enterprise modeling controller (199) is configured to generate Drag Drop Design Delivery Rapid Enterprise Architecture Models (3D DREAM).

Also stored in RAM (168) is an operating system (154). Operating systems useful for modeling an enterprise according to embodiments of the present invention include UNIX™ Linux™ Microsoft XP™ AIX™ IBM's i5/OS™ and others as will occur to those of skill in the art. The operating system (154) and the enterprise modeling controller (199) in the example of FIG. 1 are shown in RAM (168), but many components of such software typically are stored in non-volatile memory also, such as, for example, on a disk drive (170).

Figure 1:
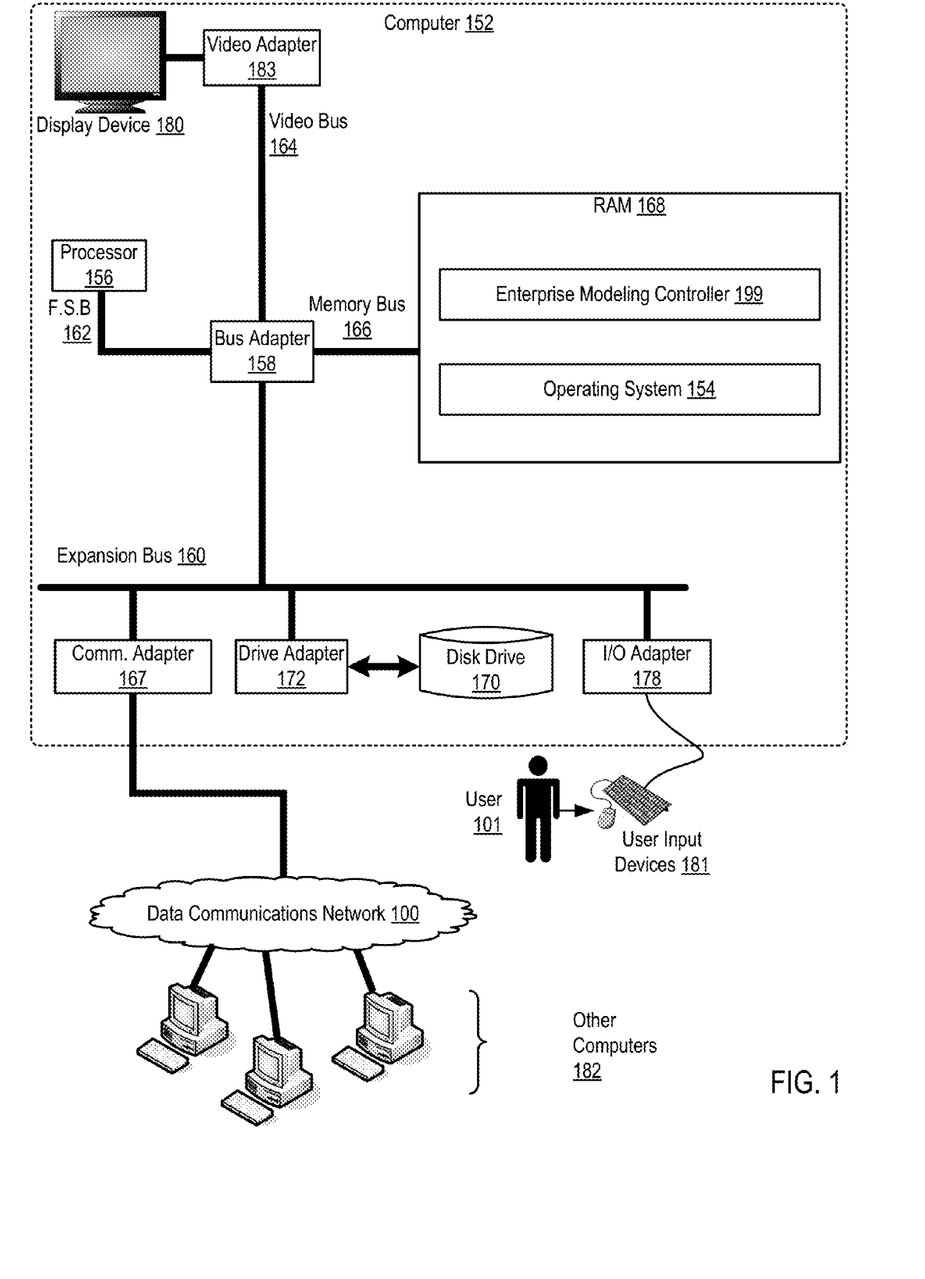
FIG. 1 sets forth a block diagram of automated computing machinery comprising an exemplary computer useful in modeling an enterprise according to embodiments of the present invention.

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for modeling an enterprise according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (183), which is an example of an I/O adapter specially designed for graphic output to a display device (180) such as a display screen or computer monitor. Video adapter (183) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for modeling an enterprise according to embodiments of the present invention include modems for wired dial-up communications, Ethernet (IEEE 802.3) adapters for wired data communications network communications, and 802.11 adapters for wireless data communications network communications.

As explained above, an enterprise modeling controller, such as the enterprise modeling controller (199) of FIG. 1, is configured to provide a user interface to a user. For further explanation, FIG. 2 sets forth a diagram of an example user interface (200) provided by an enterprise modeling controller for modeling an enterprise according to embodiments of the present invention.

Figure 2:
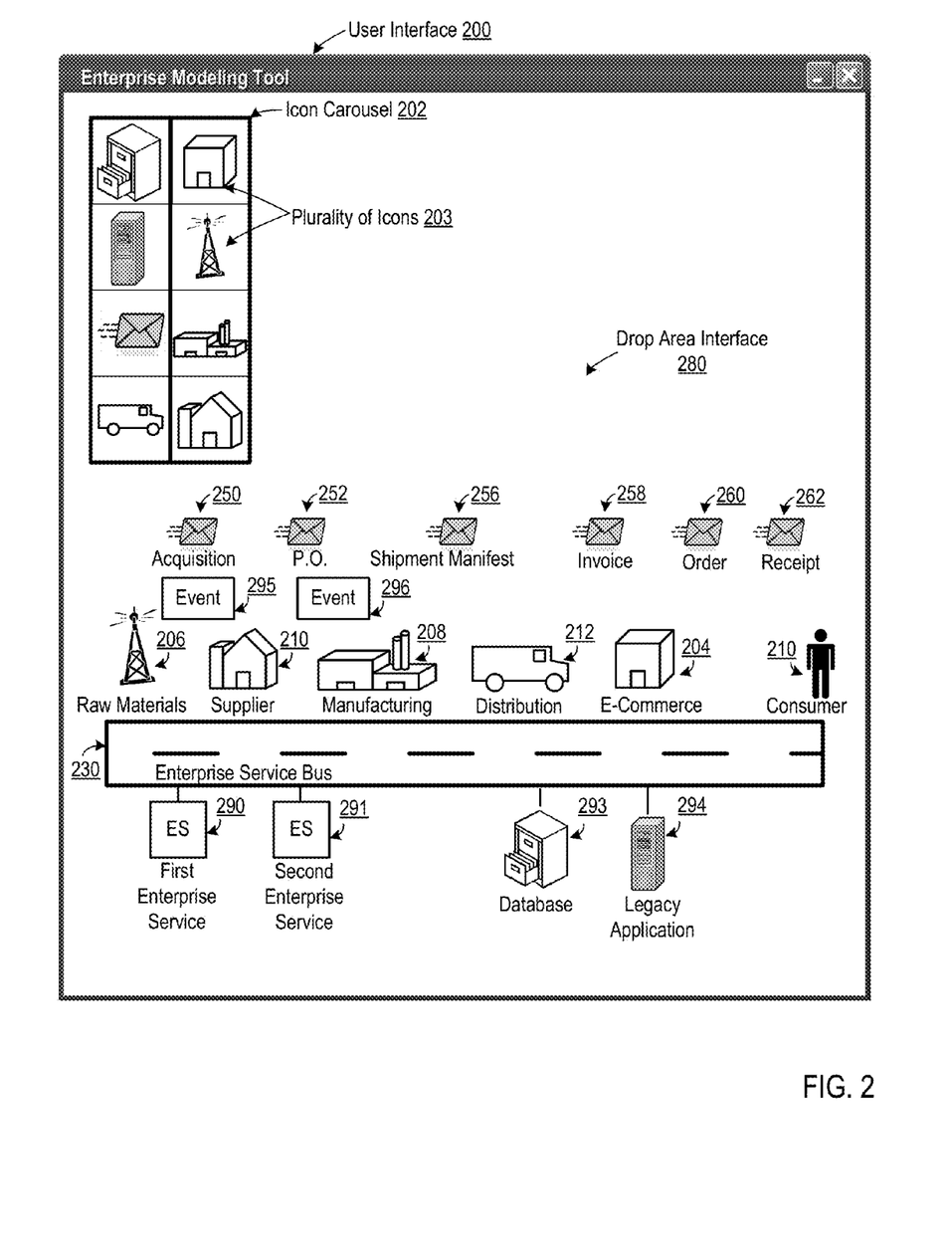
FIG. 2 sets forth a diagram of an example user interface provided by an enterprise modeling controller for modeling an enterprise according to embodiments of the present invention.

The example user interface (200) of FIG. 2 includes an icon carousel (202) and a drop area interface (280) for moving selected icons from the icon carousel (202). The icon carousel (202) of FIG. 2 includes a plurality of icons (203). Each icon of the plurality of icons (203) represents a solution component configuration.

As part of the process for modeling a particular enterprise, a user may identify what solution components are part of the enterprise. For example, the user may speak with a representative of the enterprise and determine what units or business components form one or more aspects of the enterprise. For each identified solution component of the enterprise, the user selects an icon from the icon carousel (202) representing a solution component. In the example of FIG. 2, icons have been moved into the drop area interface (280) to form a supply chain enterprise. Although a supply chain enterprise is modeled in the example of FIG. 2, this is for illustration purposes only—any number of other types of enterprises may be modeled according to embodiments of the present invention.

In the example of FIG. 2, the drop area interface (280) includes a raw materials icon (206), a supplier icon (210), a manufacturing icon (208), a distribution icon (212), an e-commerce icon (204), and a consumer icon (210) placed along an enterprise service bus icon (230). As explained above, each icon represents a particular solution component. That is, the raw materials icon (206) may represent a specific configuration of a raw materials provider. For example, the solution component configuration corresponding to the raw material icon (206) may indicate specific messages that are received and sent by the raw material provider; events that are generated by the raw materials provider; volume of orders and acquisitions generated by the raw materials provider; method of communication that orders and acquisitions are delivered and received; message frequency, message format, direction of messages. As explained above, each solution component configuration may have associated configuration data detailing the particular aspects of the configuration.

In the example of FIG. 2, a first event icon (295) is placed between the raw materials icon (206) and the supplier icon (210) and a second event icon (296) is placed between the supplier icon (210) and the manufacturing icon (208). Each event icon may correspond to a particular event. For example, the first event icon (295) may correspond to an event configuration detailing the transmission of an acquisition message between a raw material provider and a supplier. According to embodiments of the present invention, the enterprise modeling controller (199) may generate the first event (295) as part of generating an integration pattern or a user may drag the event icon from the icon carousel.

In the example of FIG. 2, icons (250-262) representing message solution component configurations are within the drop area interface (280). For example, an acquisition icon (250) is placed between the raw materials icon (206) and the supplier icon (210) to model the action in the enterprise where a raw material provider sends acquisitions to the supplier. Each solution component configuration is modifiable. For example, a user may click on the acquisition icon (250) and be presented with a configuration window that enables the user to change the configuration data associated with the solution component configuration represented by the acquisition icon (250). In this example, the user may modify the format of the acquisition message, the frequency of the acquisition message, the delivery method of the acquisition message, and others as will occur to one of skill in the art. A purchase order icon (252), a shipment manifest icon (256), an invoice (258), an order (260), and a receipt (262) are also included in the drop area interface to represent solution component configurations of different messages passed between solution components of the supply chain enterprise.

The enterprise service bus icon (230) represents a particular configuration of an enterprise service bus. An enterprise service bus (ESB) is a software architecture model used for designing and implementing the interaction and communication between mutually interacting software applications in Service Oriented Architecture (SOA). ESB is a software architecture model for distributed computing it is a specialty variant of the more general client server software architecture model and promotes strictly asynchronous message oriented design for communication and interaction between applications.

An ESB may be used to transport the design concept of modern operating systems to networks of disparate and independent computers. Like concurrent operating systems an ESB caters for commonly needed commodity services in addition to adoption, translation and routing of a client request to the appropriate answering service. The prime duties of an ESB may be to monitor and control routing of message exchange between services; resolve contention between communicating service components; control deployment and versioning of services; marshal use of redundant services; and cater for commonly needed commodity services like event handling and event choreography, data transformation and mapping, message and event queuing and sequencing, security or exception handling, protocol conversion and enforcing proper quality of communication service.

Service-oriented architecture (SOA) is a set of principles and methodologies for designing and developing software in the form of interoperable services. These services may be well-defined business functionalities that are built as software components (discrete pieces of code and/or data structures) that can be reused for different purposes.

SOA generally provides a way for consumers of services, such as web-based applications, to be aware of available SOA-based services. For example, several disparate departments within a company may develop and deploy SOA services in different implementation languages; their respective clients will benefit from a well-defined interface to access them. SOA defines how to integrate widely disparate applications for a Web-based environment and uses multiple implementation platforms. Rather than defining an API, SOA defines the interface in terms of protocols and functionality. An endpoint is the entry point for such a SOA implementation.

Service-orientation requires loose coupling of services with operating systems and other technologies that underlie applications. SOA separates functions into distinct units, or services, which developers make accessible over a network in order to allow users to combine and reuse them in the production of applications. These services and their corresponding consumers communicate with each other by passing data in a well-defined, shared format, or by coordinating an activity between two or more services. An enterprise model generated based on the user interface of FIG. 2 may include at least one domain detailing how each solution component uses enterprise services and resources to communicate with each other.

In the example of FIG. 2, a first enterprise service icon (290) is used to represent a first enterprise service solution component configuration. The user interface (200) of FIG. 2 also includes a second enterprise service icon (291) that represents a second enterprise service solution component configuration. Each of the enterprise service solution components may provide a particular service for the transmission of messages or establishment of communication between one or more other solution components. These enterprise services may be moved to the drop area interface by a user or may be placed there by the enterprise modeling controller as part of generating an integration pattern. In the example of FIG. 2, a database icon (293) and a legacy application icon (294) are also connected to the ESB (230) to provide resources and services to one or more solution components of the enterprise being modeled.

As explained above, an enterprise modeling controller, such as the enterprise modeling controller (199) of FIG. 1, is configured to provide a user interface to a user. For further explanation, FIG. 3 sets forth a diagram of another example user interface provided by an enterprise modeling controller for modeling an enterprise according to embodiments of the present invention.

According to embodiments of the present invention, each solution component configuration may have one or more sub-solution component configurations. For example, an e-commerce solution component may have one or more departments, such as accounting, shipping, purchasing, marketing, product manager, and administrative. According to embodiments of the present invention, a user may view or modify sub-solution component configurations of a particular solution component configuration. As described above, icons within the carousel and drop area interface may be three dimensional. As shown in the example of FIG. 2 and FIG. 3, the e-commerce icon (204) is three dimensional in that the e-commerce icon includes other solution component icons within it.

Figure 3:
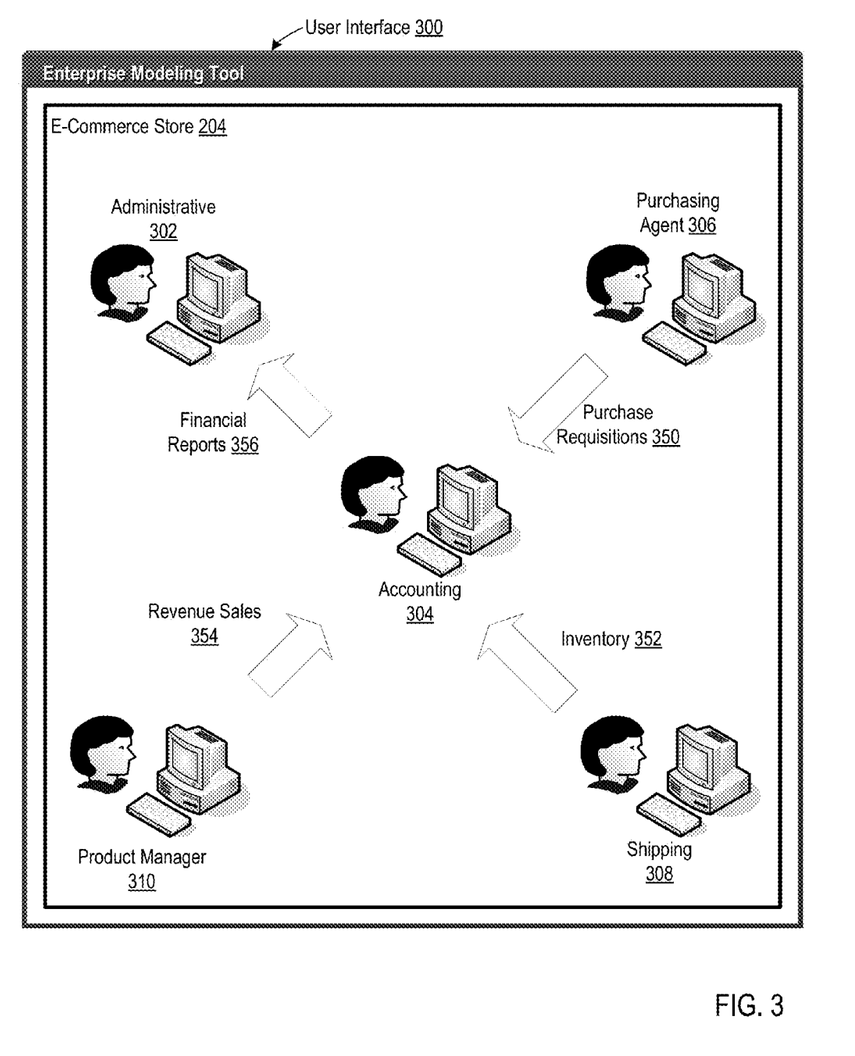
FIG. 3 sets forth a diagram of another example user interface provided by an enterprise modeling controller for modeling an enterprise according to embodiments of the present invention.

The user interface (300) of FIG. 3 is an example of a user interface depicting sub-solution component configurations of the e-commerce solution component configuration represented by the e-commerce icon (204) of FIG. 2. The enterprise modeling controller (100) may create these sub-solution component configurations based on default configurations or a user may create the sub-solution component configurations.

A user may modify the sub-solution component configuration data associated with a sub-solution component configuration. Modifying configuration data may include changing data flow, roles and responsibilities, event triggers and responses, volume-metrics, message format, and synchronicity. For example, configuration data associated with the purchasing agent icon (306) may indicate that a role of the purchasing agent solution component is 'purchasing agent,' role direction is 'receive message format,' frequency is '10 daily,' event is generate 'purchase order' in response to 'purchase requisition.' In this example, each of aspect indicated in the configuration data may be modified by the user, thus changing the solution component configuration of the e-commerce solution component.

Figure 4:
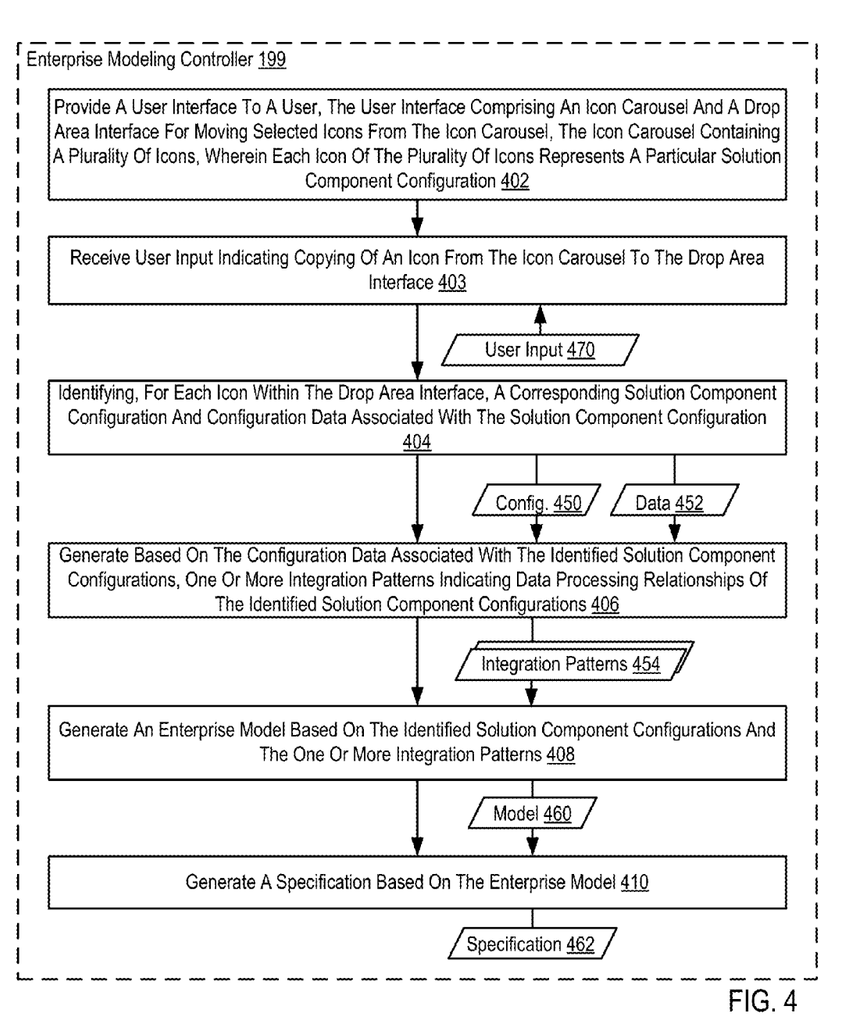
FIG. 4 sets forth a flow chart illustrating an example of a method for modeling an enterprise according to embodiments of the present invention.

For further explanation, FIG. 4 sets forth a flow chart illustrating an example of a method for modeling an enterprise according to embodiments of the present invention. For ease of explanation only, components of the system of FIG. 1 and the example user interface (200) of FIG. 2 are referenced in the description of FIG. 4. Although the user interface (200) of FIG. 2 is referenced in the description of FIG. 4, other user interfaces may be utilized in the method of FIG. 4 in accordance with the present invention.

The method of FIG. 4 includes providing (402), by the enterprise modeling controller (199), a user interface (200) to a user (101). The user interface (200) of FIG. 2 includes an icon carousel (202) and a drop area interface (280) for moving selected icons from the icon carousel (202). The icon carousel (202) of FIG. 2 includes a plurality of icons (203) where each icon of the plurality of icons (203) represents a particular solution component configuration. A solution component is a representation of some aspect of an enterprise and a solution component configuration is a representation of a solution component performing one or more particular tasks in one or more particular ways. Providing (402) a user interface (200) to a user (101) may be carried out by displaying a graphical user interface window to a user via a display device.

The method of FIG. 4 also includes receiving (403) user input (470) indicating copying of an icon from the icon carousel (202) to the drop area interface (280). Receiving (403) user input (470) indicating copying of an icon from the icon carousel (202) to the drop area interface (20) may be carried out by determining movement of an icon from an icon carousel to a user drop area interface.

The method of FIG. 4 also includes identifying (404) for each icon (204-262) within the drop area interface (280), by the enterprise modeling controller (199), a corresponding solution component configuration (450) and configuration data (452) associated with the solution component configuration (450). Configuration data is a data structure containing all the parameters and characteristics associated with the particular solution component configuration. Identifying for each icon (204-262) within the drop area interface (280), a corresponding solution component configuration (450) and configuration data (452) associated with the solution component configuration (450) may be carried out by examining metadata associated with each icon to determine a corresponding solution component configuration and configuration data.

The method of FIG. 4 also includes generating (406) based on the configuration data (452) associated with the identified solution component configurations (450), by the enterprise modeling controller (199), one or more integration patterns (454) indicating data processing relationships of the identified solution component configurations (450). An integration pattern is a connection configuration that indicates how particular solution component configurations interoperate, types of services that are employed, and methods that are used. For example, an integration pattern may recognize that a supplier solution component configuration and a manufacturer solution component configuration would use an enterprise web-based service to communicate an acquisition message in response an event occurring. In this example, generation of the integration pattern may result in the supplier solution component configuration being linked to the enterprise service.

Integration patterns may be based on a variety of factors including qualities of the proposed configuration. Examples of qualities of the proposed configuration that may be considered include availability of components selected in the configuration, modifiability of components selected in the configuration, performance of components selected in the configuration, security of configuration, testability of the configuration and components, and usability of the components selected in the configuration. In addition, integration patterns may also be generated based on business qualities, such as time-to-market, cost and benefit analysis, projected life time of components selected in configuration, target market, rollout schedule, and legacy integration. Furthermore, integration patterns may also be generated based on overall architectural qualities, such as conceptual integrity, correctness and completeness, and build-ability.

For example, the enterprise modeling controller (199) may determine that a raw materials provider solution component and a supplier solution component may communicate messages through one of email, file transfer, and payment integration. Based on this determination, the enterprise modeling controller (199) may generate an integration pattern of the raw materials solution component transmitting an email message to the supplier solution component.

Integration patterns may also examine volume transaction flow metrics of individual solution component configurations to determine the best transaction between the individual solution component configurations. For example, if a particular solution component configuration has a particular amount of data flowing out and is coupled to another solution component configuration with a capability of processing another amount of data, the enterprise modeling controller may generate an integration pattern that best facilitates that transaction. Identifying the best integration pattern may include changing services utilized between the two solution component configuration and also changing characteristics and parameters associated with one or more the solution component configurations.

Generating (406) based on the configuration data (452) associated with the identified solution component configurations (450), by the enterprise modeling controller (199), one or more integration patterns (454) may be carried out by examining data associating with each solution component configuration to identify matching identifiers which indicate like connecting solution component configurations; using a list of default configuration connection information indicating common connections between solution component configurations; generating one or more additional solution component configurations; and modifying configuration data associated with solution component configurations.

The method of FIG. 4 also includes generating (408), by the enterprise modeling controller (199), an enterprise model (460) based on the identified solution component configurations (450) and the one or more integration patterns (454). An enterprise model is a representation of the solution component configurations connected in one or more integration patterns. Said another way, an enterprise model is an abstract representation, description and definition of the structure, processes, information and resources of an identifiable business, government body, or other large organization. An enterprise model represents a form of 'solution architecture,' which is relative to the decisions ahead, a specific blend of technology, systems, business and market options. That is, an enterprise model may be considered a model that describes the logical organization of business functions, business capabilities, business processes, people, information resources, business systems, software applications, computing capabilities, or information exchange and communications infrastructure within the enterprise.

Generating (408), by the enterprise modeling controller (199), an enterprise model (460) based on the identified solution component configurations (450) and the one or more integration patterns (454) may be carried out by generating an enterprise architecture framework. An enterprise architecture framework bundles tools, techniques, artifact descriptions, process models, reference models and guidance used by architects in the production of enterprise-specific architectural description. Several enterprise architecture frameworks break down the practice of enterprise architecture into a number of practice areas or domains. Said another way, an enterprise architecture framework (EA framework) is an architecture framework which defines how to organize the structure and views associated with an enterprise architecture. An architecture framework may include many layers or views, such as business processes and activities; data that must be collected, organized, safeguarded, and distributed; applications such as custom or off-the-shelf software tools; and technology such as computer systems and telephone networks.

The method of FIG. 4 also includes generating (410), by the enterprise modeling controller (199), a specification (462) based on the enterprise model (460). According to embodiments of the present invention, a different specification may be generated for each domain of the enterprise model. For example, from one enterprise model, an enterprise modeling controller may generate a planner's view specification, an owner's view specification, a designer's view specification and a developer's view specification. For example, the planner's view specification may state the enterprise's objectives and goals, the owner's view specification may indicate the enterprise's processes and organization, the designer's view specification may indicate the enterprise's systems and data, and the developer's view specification may recite the technology used and any other relevant spheres of interest to implementing the enterprise. Generating (410), by the enterprise modeling controller (199), a specification (462) based on the enterprise model (460) may be carried out by receiving an indication of the type or domain of the enterprise; identifying information corresponding to the domain of the enterprise; and compiling the information into a document or file.

This is, the enterprise modeling controller (199) enables a user to build end to end enterprise architectural solutions supporting a business model through the use of an easy to use intuitive drag and drop user interface that does not require formal training of Object Oriented Analysis and Design techniques, knowledge of Unified Modeling Language, or any programming languages. By using known business symbols and icons to translate into business model solution components, a business analysis or organization subject matter expert can rapidly define enterprise architecture without understanding the technical connections between solution components.

Figure 5:
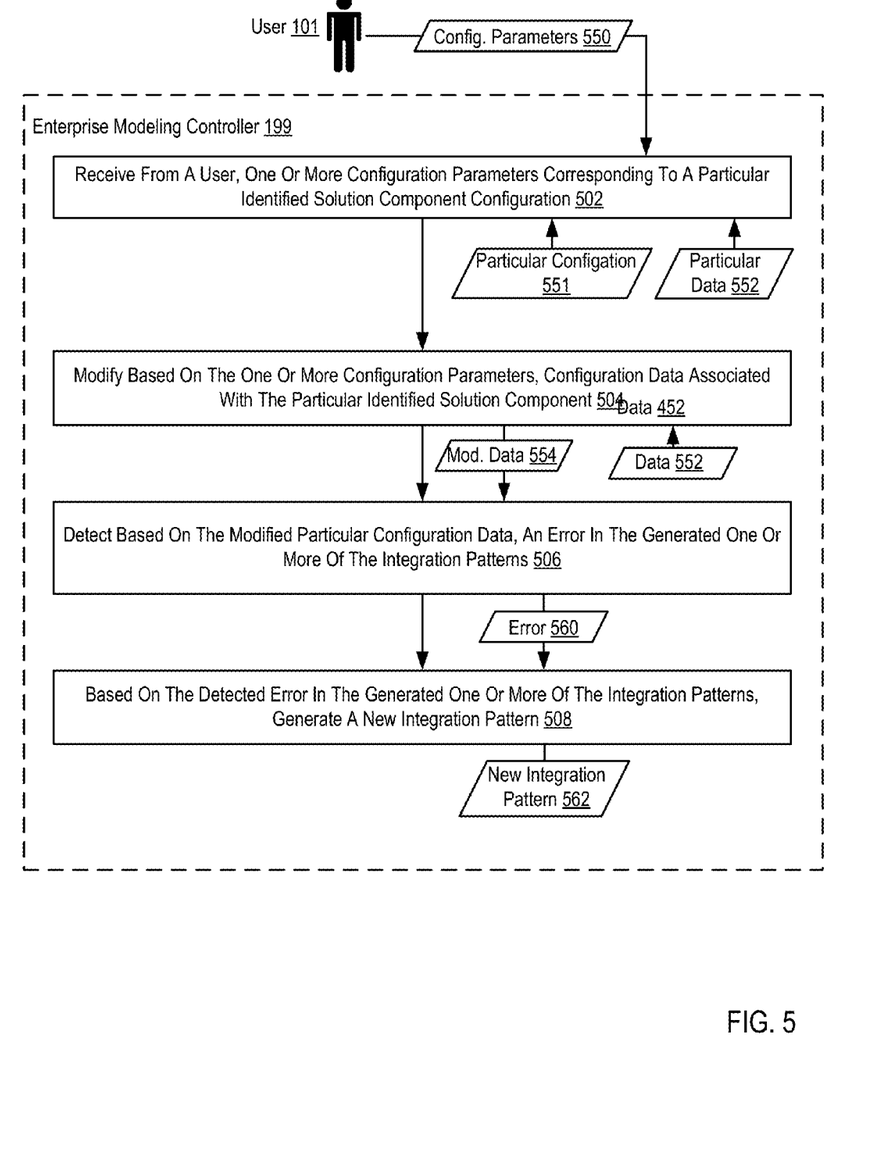
FIG. 5 sets forth a flow chart illustrating another example of a method for modeling an enterprise according to embodiments of the present invention.

For further explanation, FIG. 5 sets forth a flow chart illustrating another example of a method for modeling an enterprise according to embodiments of the present invention. For ease of explanation only, components of the system of FIG. 1, the example user interface (200) of FIG. 2, and elements illustrated in FIG. 4, are referenced in the description of FIG. 5. Although the user interface (200) of FIG. 2 is referenced in the description of FIG. 5, other user interfaces may be utilized in the method of FIG. 5 in accordance with the present invention.

The method of FIG. 5 includes receiving (502), from a user (101), one or more configuration parameters (550) corresponding to a particular identified solution component configuration (551). A configuration parameter is data used for modeling a particular solution component. Receiving (502), from a user (101), one or more configuration parameters (550) corresponding to a particular identified solution component configuration (551) may be carried out by receiving input from a user input device, such as a keyboard.

The method of FIG. 5 includes modifying (504) based on the one or more configuration parameters (550), by the enterprise modeling controller (199), particular configuration data (552) associated with the particular identified solution component configuration (551). Modifying (504) based on the one or more configuration parameters (550), by the enterprise modeling controller (199), particular configuration data (552) associated with the particular identified solution component configuration (551) may be carried out by changing one or more attributes or characteristics of the configuration data; and modeling the tasks performed by the configuration solution component.

The method of FIG. 5 includes detecting (506) based on the modified particular configuration data (554), by the enterprise modeling controller (199), an error (560) in the generated one or more of the integration patterns (462). An error is a conflict in how one or more solution components are configured to connect or communicate. Detecting (506) based on the modified particular configuration data (554), by the enterprise modeling controller (199), an error (560) in the generated one or more of the integration patterns (462) may be carried out by analyzing the solution component configuration; and comparing configuration data of the solution component configuration with default communication examples.

The method of FIG. 5 includes generating (508) a new integration pattern (562) based on the detected error (560) in the generated one or more of the integration patterns (454). Generating (508) a new integration pattern (562) based on the detected error (560) in the generated one or more of the integration patterns (454) may be carried out by generating a new enterprise architecture framework.

Figure 6:
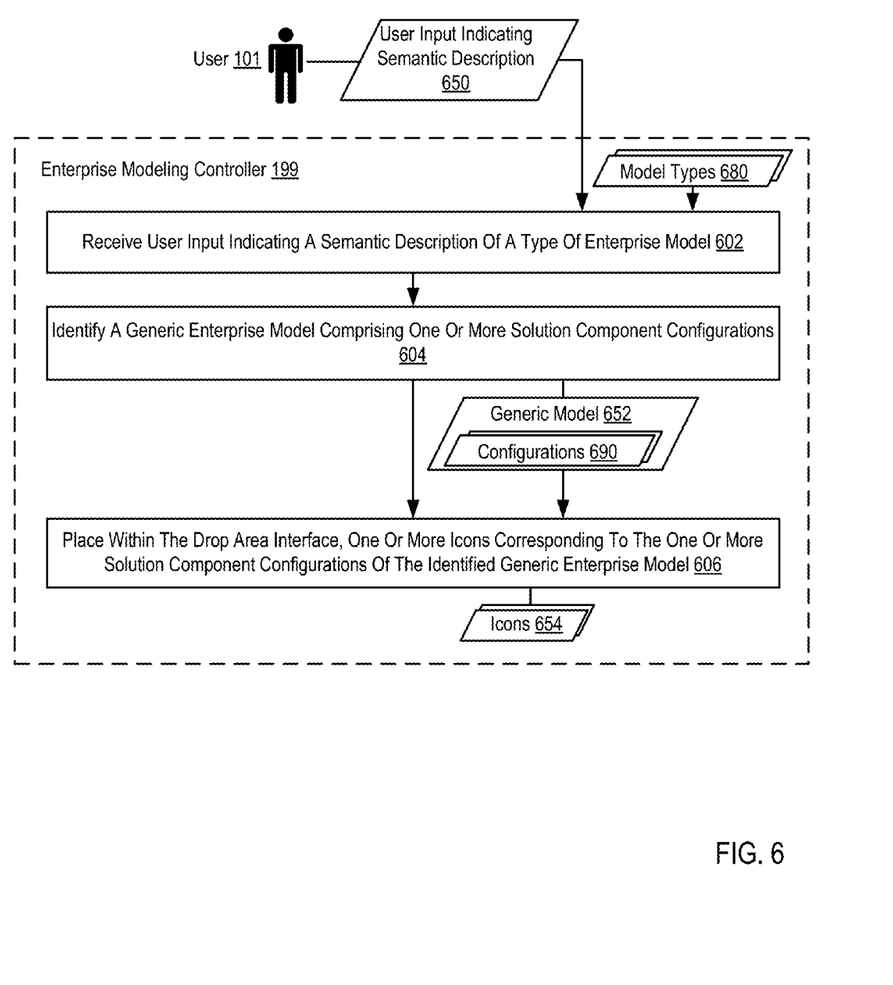
FIG. 6 sets forth a flow chart illustrating another example of a method for modeling an enterprise according to embodiments of the present invention.

For further explanation, FIG. 6 sets forth a flow chart illustrating another example of a method for modeling an enterprise according to embodiments of the present invention. For ease of explanation only, components of the system of FIG. 1 and the example user interface (200) of FIG. 2 are referenced in the description of FIG. 6. Although the user interface (200) of FIG. 2 is referenced in the description of FIG. 6, other user interfaces may be utilized in the method of FIG. 6 in accordance with the present invention.

The method of FIG. 6 includes receiving (602), by the enterprise modeling controller (199), user input (650) indicating a semantic description of a type of enterprise model. A semantic description is term corresponding to a particular type of enterprise model. Examples of semantic descriptions include: supply chain, manufacturing process, e-commerce, etc. Receiving (602) user input (650) indicating a semantic description of a type of enterprise model may be carried out by receiving terms via a user input device, such as a keyboard or microphone.

The method of FIG. 6 also includes identifying (604) based on the semantic description, by the enterprise modeling controller (199), a generic enterprise model (652) comprising one or more solution component configurations (690). A generic enterprise model is a default collection of solution component configurations and integration patterns. Identifying (604) a generic enterprise model (652) comprising one or more solution component configurations (690) may be carried out by examining a list associating semantic descriptions to generic enterprise models. That is, in a particular embodiment, the user can simply describe in simple terms the enterprise and the enterprise modeling controller can determine which solution components are typically in that enterprise.

The method of FIG. 6 also includes placing (606), by the enterprise modeling controller (199), within the drop area interface (280), one or more icons (654) corresponding to the one or more solution component configurations (690) of the identified generic enterprise model (652). Placing (606) within the drop area interface (280), one or more icons (654) corresponding to the one or more solution component configurations (690) of the identified generic enterprise model (652) may be carried out by displaying one or more icons in the drop area interface.

In addition, the one or more solution component configurations (690) of the identified generic enterprise model (652) may be modified or removed by a user. A user may also add an additional solution component configuration by moving an icon from an icon carousel to a drop area interface, such as the icon carousel (202) of FIG. 2. That is, the generic enterprise model (652) is used as template that may be customized. As described in FIG. 4, an enterprise model can then be used to generate a specification.

Figure 7:
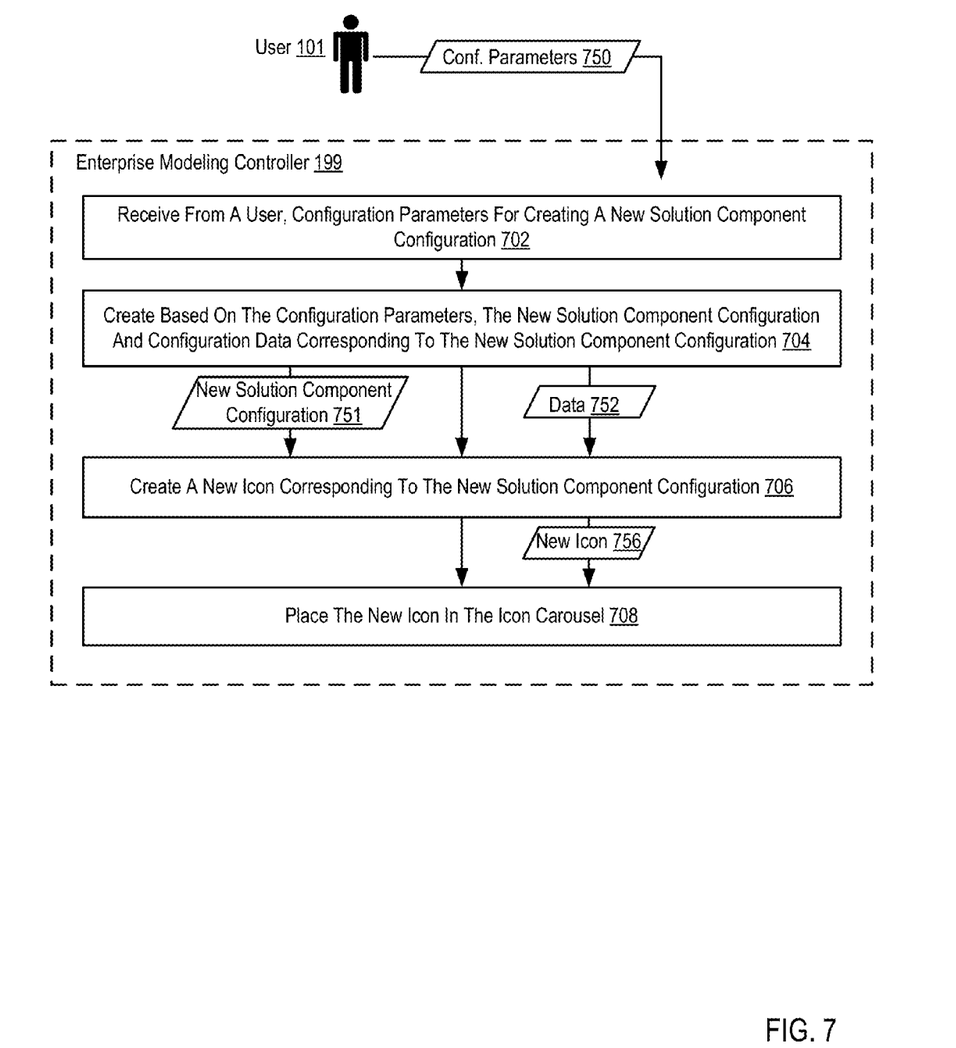
FIG. 7 sets forth a flow chart illustrating another example of a method for modeling an enterprise according to embodiments of the present invention.

For further explanation, FIG. 7 sets forth a flow chart illustrating another example of a method for modeling an enterprise according to embodiments of the present invention. For ease of explanation only, components of the system of FIG. 1 and the example user interface (200) of FIG. 2 are referenced in the description of FIG. 7. Although the user interface (200) of FIG. 2 is referenced in the description of FIG. 7, other user interfaces may be utilized in the method of FIG. 7 in accordance with the present invention.

The method of FIG. 7 includes receiving (702) from a user (101), by the enterprise modeling controller (199), configuration parameters (750) for creating a new solution component configuration (751). Receiving (702) from a user (101), by the enterprise modeling controller (199), configuration parameters (750) for creating a new solution component configuration (751) may be carried out by receiving user input for a user input device.

The method of FIG. 7 also includes creating (704) based on the configuration parameters, by the enterprise modeling controller (199), the new solution component configuration (751) and configuration data (752) corresponding to the new solution component configuration (751). Creating (704) based on the configuration parameters, the new solution component configuration (751) and configuration data (752) corresponding to the new solution component configuration (751) may be carried out by creating a data structure containing the configuration parameters; retrieving default configuration data; and storing the default configuration data in the data structure.

The method of FIG. 7 also includes creating (706), by the enterprise modeling controller (199), a new icon (756) corresponding to the new solution component configuration (751). Creating (706) a new icon (756) corresponding to the new solution component configuration (751) may be carried out by loading an image; and storing the image as icon.

The method of FIG. 7 also includes placing (708), by the enterprise modeling controller (199), the new icon (756) in the icon carousel (202). Placing (708), by the enterprise modeling controller (199), the new icon (756) in the icon carousel (202) may be carried out by storing data associated with the new icon in the data structure corresponding to the icon carousel.

Exemplary embodiments of the present invention are described largely in the context of a fully functional computer system for modeling an enterprise. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer implemented method of modeling an enterprise, the method comprising:

providing, by an enterprise modeling controller, a user interface to a user, the user interface comprising an icon carousel and a drop area interface for moving selected icons from the icon carousel, the icon carousel containing a plurality of icons, wherein each icon of the plurality of icons represents a particular solution component configuration;

for each icon within the drop area interface, identifying, by the enterprise modeling controller, a corresponding solution component configuration and configuration data associated with the solution component configuration;

generating based on the configuration data associated with the identified solution component configurations, by the enterprise modeling controller, one or more integration patterns indicating data processing relationships of the identified solution component configurations, wherein the one or more integration patterns comprises a service used for communication between the identified solution component configurations;

linking, by the enterprise modeling controller, at least one of the identified solution component configurations to the service based on the one or more integration patterns;

generating, by the enterprise modeling controller, an enterprise model based on the identified solution component configurations and the one or more integration patterns, wherein the enterprise model comprises a plurality of domains, each domain representing a practice area, each domain providing a distinct type of information;

generating, by the enterprise modeling controller, a different specification for each distinct type of information within the plurality of domains of the enterprise model, the specifications including a planner's view specification, an owner's view specification, a designer's view specification and a developer's view specification;

receiving, from a user, one or more configuration parameters corresponding to a particular identified solution component configuration;

modifying based on the one or more configuration parameters, by the enterprise modeling controller, the configuration data of the particular identified solution component configuration;

detecting based on the modified configuration data of the particular identified solution component configuration, by the enterprise modeling controller, an error in the generated one or more of the integration patterns by analyzing the solution component configuration and comparing configuration data of the solution component configuration with default communication examples, wherein the error is a conflict in how one or more solution components are configured to communicate; and based on the detected error in the generated one or more of the integration patterns, generating a new integration pattern including generating a new enterprise architecture framework.

2. The method of claim 1 further comprising: receiving user input indicating copying of an icon from the icon carousel to the drop area interface.

3. The method of claim 1 further comprising:
receiving user input indicating a semantic description of a type of enterprise model;
identifying based on the semantic description, a generic enterprise model comprising one or more solution component configurations; and
placing within the drop area interface, one or more icons corresponding to the one or more solution component configurations of the identified generic enterprise model.

4. The method of claim 1 wherein configuration data indicates at least one of: a relationship of the solution component with another solution component and data processing mechanisms within the solution component.

5. The method of claim 1 further comprising:
receiving from a user, by the enterprise modeling controller, configuration parameters for creating a new solution component configuration;
creating based on the configuration parameters, configuration data corresponding to the new solution component configuration;
creating a new icon corresponding to the new solution component configuration; and
placing, by the enterprise modeling controller, the new icon in the icon carousel.

6. An apparatus for modeling an enterprise, the apparatus comprising a computer processor, a computer memory operatively coupled to the computer processor, the computer memory having disposed within it computer program instructions that, when executed by the computer processor, cause the apparatus to carry out the steps of:
providing, by an enterprise modeling controller, a user interface to a user, the user interface comprising an icon carousel and a drop area interface for moving selected icons from the icon carousel, the icon carousel containing a plurality of icons, wherein each icon of the plurality of icons represents a particular solution component configuration;
for each icon within the drop area interface, identifying, by the enterprise modeling controller, a corresponding solution component configuration and configuration data associated with the solution component configuration;
generating based on the configuration data associated with the identified solution component configurations, by the enterprise modeling controller, one or more integration patterns indicating data processing relationships of the identified solution component configurations, wherein the one or more integration patterns comprises a service used for communication between the identified solution component configurations;
linking, by the enterprise modeling controller, at least one of the identified solution component configurations to the service based on the one or more integration patterns;
generating, by the enterprise modeling controller, an enterprise model based on the identified solution component configurations and the one or more integration patterns, wherein the enterprise model comprises a plurality of domains, each domain representing a practice area, each domain providing a distinct type of information;
generating, by the enterprise modeling controller, a different specification for each distinct type of information within the plurality of domains of the enterprise model, the specifications including a planner's view specification, an owner's view specification, a designer's view specification and a developer's view specification;
receiving, from a user, one or more configuration parameters corresponding to a particular identified solution component configuration;
modifying based on the one or more configuration parameters, by the enterprise modeling controller, the configuration data of the particular identified solution component configuration;
detecting based on the modified configuration data of the particular identified solution component configuration, by the enterprise modeling controller, an error in the generated one or more of the integration patterns by analyzing the solution component configuration and comparing configuration data of the solution component configuration with default communication examples, wherein the error is a conflict in how one or more solution components are configured to communicate; and
based on the detected error in the generated one or more of the integration patterns, generating a new integration pattern including generating a new enterprise architecture framework.

7. The apparatus of claim 6 further comprising computer program instructions that, when executed by the computer processor, cause the apparatus to carry out the steps of receiving user input indicating copying of an icon from the icon carousel to the drop area interface.

8. The apparatus of claim 6 further comprising computer program instructions that, when executed by the computer processor, cause the apparatus to carry out the steps of:
receiving user input indicating a semantic description of a type of enterprise model;
identifying based on the semantic description, a generic enterprise model comprising one or more solution component configurations; and
placing within the drop area interface, one or more icons corresponding to the one or more solution component configurations of the identified generic enterprise model.

9. The apparatus of claim 6 wherein configuration data indicates at least one of: a relationship of the solution component with another solution component and data processing mechanisms within the solution component.

10. The apparatus of claim 6 further comprising computer program instructions that, when executed by the computer processor, cause the apparatus to carry out the steps of:
receiving from a user, by the enterprise modeling controller, configuration parameters for creating a new solution component configuration;

creating based on the configuration parameters, configuration data corresponding to the new solution component configuration;

creating a new icon corresponding to the new solution component configuration; and placing, by the enterprise modeling controller, the new icon in the icon carousel.

11. A computer program product for modeling an enterprise, the computer program product comprising a computer readable medium, wherein the computer readable medium is not a signal, the computer readable medium comprising computer program instructions that, when executed, cause a computer to carry out the steps of:

providing, by an enterprise modeling controller, a user interface to a user, the user interface comprising an icon carousel and a drop area interface for moving selected icons from the icon carousel, the icon carousel containing a plurality of icons, wherein each icon of the plurality of icons represents a particular solution component configuration;

for each icon within the drop area interface, identifying, by the enterprise modeling controller, a corresponding solution component configuration and configuration data associated with the solution component configuration;

generating based on the configuration data associated with the identified solution component configurations, by the enterprise modeling controller, one or more integration patterns indicating data processing relationships of the identified solution component configurations, wherein the one or more integration patterns comprises a service used for communication between the identified solution component configurations;

linking, by the enterprise modeling controller, at least one of the identified solution component configurations to the service based on the one or more integration patterns;

generating, by the enterprise modeling controller, an enterprise model based on the identified solution component configurations and the one or more integration patterns, wherein the enterprise model comprises a plurality of domains, each domain representing a practice area, each domain providing a distinct type of information;

generating, by the enterprise modeling controller, a different specification for each distinct type of information within the plurality of domains of the enterprise model, the specifications including a planner's view specification, an owner's view specification, a designer's view specification and a developer's view specification;

receiving, from a user, one or more configuration parameters corresponding to a particular identified solution component configuration;

modifying based on the one or more configuration parameters, by the enterprise modeling controller, the configuration data of the particular identified solution component configuration;

detecting based on the modified configuration data of the particular identified solution component configuration, by the enterprise modeling controller, an error in the generated one or more of the integration patterns by analyzing the solution component configuration and comparing configuration data of the solution component configuration with default communication examples, wherein the error is a conflict in how one or more solution components are configured to communicate; and based on the detected error in the generated one or more of the integration patterns, generating a new integration pattern including generating a new enterprise architecture framework.

12. The computer program product of claim 11 wherein configuration data indicates at least one of: a relationship of the solution component with another solution component and data processing mechanisms within the solution component.

* * * * *